United States Patent [19]
Nolting et al.

[11] Patent Number: 5,960,026
[45] Date of Patent: Sep. 28, 1999

[54] ORGANIC WASTE DISPOSAL SYSTEM

[75] Inventors: Eugene E. Nolting, Columbia; Jon Colfield, Ft. Washington, both of Md.; Roy Richard, Natick, Mass.; Steven Peterson, Annandale, Va.

[73] Assignee: The United States of America as represented by the Secretary of the Navy, Washington, D.C.

[21] Appl. No.: 08/925,994

[22] Filed: Sep. 9, 1997

[51] Int. Cl.⁶ ..................................................... H05B 7/00

[52] U.S. Cl. .................... 373/24; 219/121.48; 219/121.5

[58] Field of Search .................................. 373/18, 19, 22, 373/23, 24, 25; 219/121.11, 121.36, 121.37, 121.48, 121.5; 65/134.8

[56] References Cited

U.S. PATENT DOCUMENTS

| | | | |
|---|---|---|---|
| 4,761,793 | 8/1988 | Digne et al. | 373/24 |
| 4,780,132 | 10/1988 | Dighe et al. | 75/10.22 |
| 5,637,127 | 6/1997 | McLaughlin et al. | 65/134.8 |

*Primary Examiner*—Tu Ba Hoang
*Attorney, Agent, or Firm*—John Forrest; Jacob Shuster

[57] ABSTRACT

Organic waste material is pneumatically transported within air and mixed therewith by swirling flow through an annular injector passage of varying radial width into a reaction flow passage of an eductor nozzle section receiving the output plume of a plasma torch for initiating therein thermal gasification of the waste mixture. The plasma torch plume projects from the eductor section into a diffuser section within which thermal gasification is continued before discharge of gasified waste.

7 Claims, 2 Drawing Sheets

ORGANIC WASTE DISPOSAL SYSTEM

The present invention relates in general to the disposal of waste by thermal destruction involving use of a plasma arc torch.

BACKGROUND OF THE INVENTION

The use of a plasma arc torch as part of an apparatus or method for thermal processing of infeed materials including wastes, is already well known in the art as disclosed for example in U.S. Pat. Nos. 4,780,132 and 4,761,793 to Digne et al. and U.S. Pat. No. 5,637,127 to McLaughlin et al. The processing of organic waste materials by direct exposure to the plume of a plasma torch for waste disposal purposes by thermal gasification is of particular interest for certain installations, such as maritime onboard locations, in order to maximize volumeric reduction in solid waste, minimize waste storage requirements, eliminate odors and reduce health risks. However, currently known plasma torch associated waste disposal equipment involving thermal gasification of solid organic waste are excessively large, weighty and labor intensive making it unsuitable for onboard use or comparable installations. Typically, waste disposal equipment utilizing plasma torches employ very large refractory lined chambers into which the waste is dumped for thermal processing therein by heating to a high temperature causing disintegration of complex organic molecules resulting in the formation of pyrolytic fuel gases which are burned by secondary combustion to form primarily carbon dioxide and water vapor as the gasification products safely discharged into the atmosphere.

It is therefore an important objective of the present invention to provide a plasma arc torch heat processing system for disposal of organic waste in a much smaller volume than conventional incinerators or plasma reactors, and at a higher processing rate to produce a benign gaseous discharge. Another objective is to reduce the effect of thermal stresses associated with rapid startup and shut down of the plasma source. It is yet another objective of the present invention to reduce labor intensive maintenance and operational costs associated with plasma thermal processing equipment as well as the associated facilities for waste infeed thereto.

SUMMARY OF THE INVENTION

In accordance with the present invention, infeed of solid particle material such as organic waste and air as a carrier fluid is pneumatically delivered to a disposal apparatus through an inlet tube to undergo a high degree of swirl within an annular flow passage of decreasing radial width formed about a plasma arc torch extending through an injector section of the apparatus. The radially inner portion of such injector flow passage is in fluid communication with one axial end of a reaction flow passage of a convergent flow nozzle eductor section of the disposal apparatus into which the plasma arc torch projects from the ejector section. The output plume of the torch extends axially through the convergent flow nozzle to initiate thermal gasification therein and into a divergent flow passage of a diffuser section of the apparatus from which gasified waste products are discharged. Flow through the injector and eductor sections enhances mixing of the waste and air for more efficient, rapid and thorough thermal processing by the torch plume during waste mixture flow from the reaction flow passage of the eductor section into the divergent passage of the diffuser section. The foregoing apparatus arrangement enables control of the carrier fluid both in amount and composition to adjust the chemistry of the output gaseous discharge as well as to provide other advantages and operational capabilities.

BRIEF DESCRIPTION OF DRAWING FIGURES

A more complete appreciation of the invention and many of its attendant advantages will be readily appreciated as the same becomes better understood by reference to the following detailed description when considered in connection with the accompanying drawing wherein:

FIG. 1 is a side elevation view of the waste disposal apparatus associated with one embodiment of the present invention;

FIG. 2 is a side section view taken substantially through a plane indicated by section line 2—2 in FIG. 1; and FIGS. 3 and 4 are transverse section views taken substantially through planes indicated by section lines 3—3 and 4—4 in FIG. 2.

DETAILED DESCRIPTION OF PREFERRED EMBODIMENT

Figure 1:
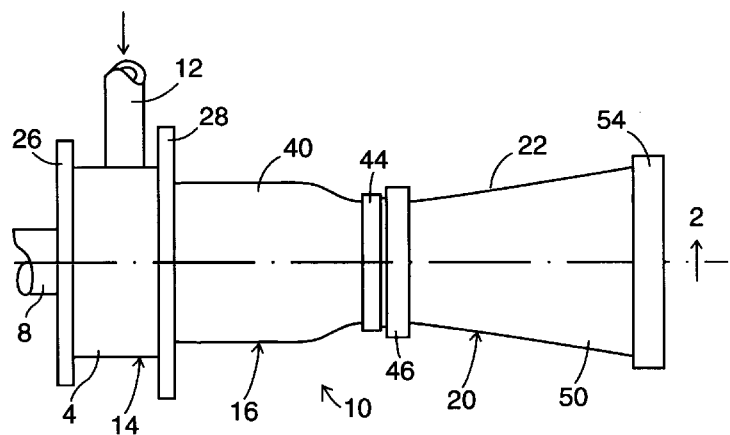

Referring now to the drawing in detail, FIG. 1 illustrates apparatus 10 embodying a disposal process in accordance with one embodiment, with respect to organic waste mixed with air as a carrier fluid pneumatically fed by some infeed system into the apparatus 10 through an inlet tube 12. An injector section 14 of the apparatus 10 to which the inlet tube 12 is connected delivers the waste mixture to an eductor section 16 of the apparatus 10. A plasma arc torch 18 extends through the injector section 14 which is interconnected by the eductor section 16 with an exit diffuser section 20 from which gasified waste is discharged in the direction of the apparatus axis 22 with which the plasma arc torch 18 is aligned.

Figure 2:
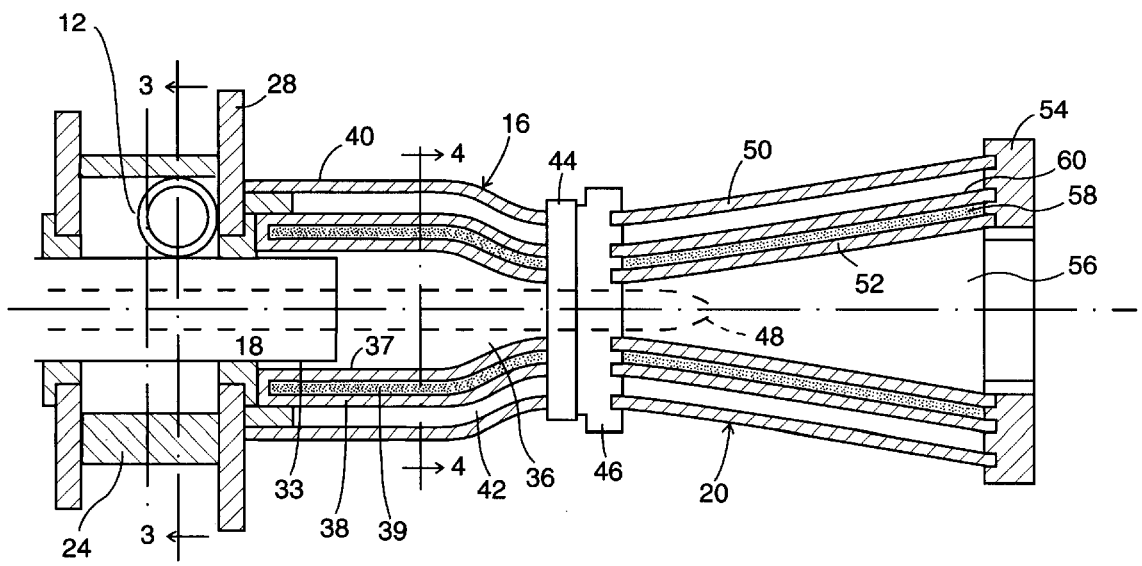
Figure 3:
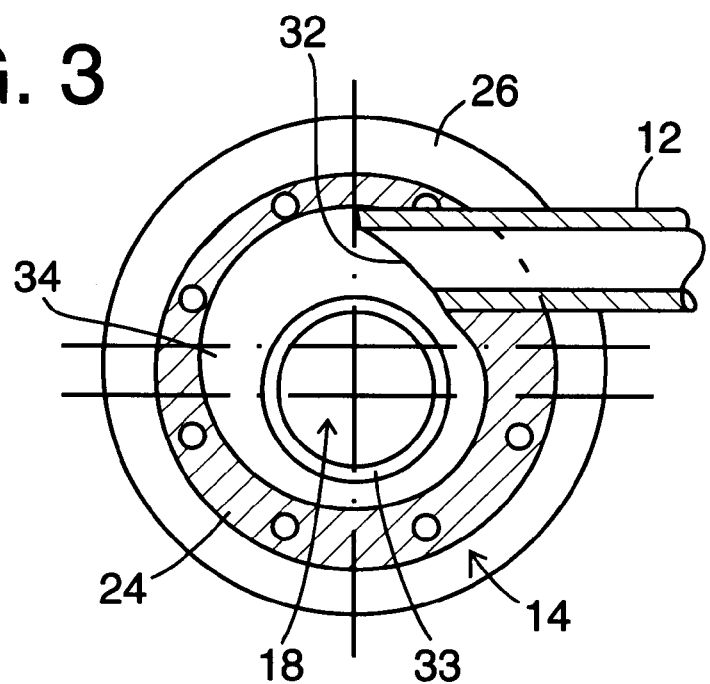
Figure 4:
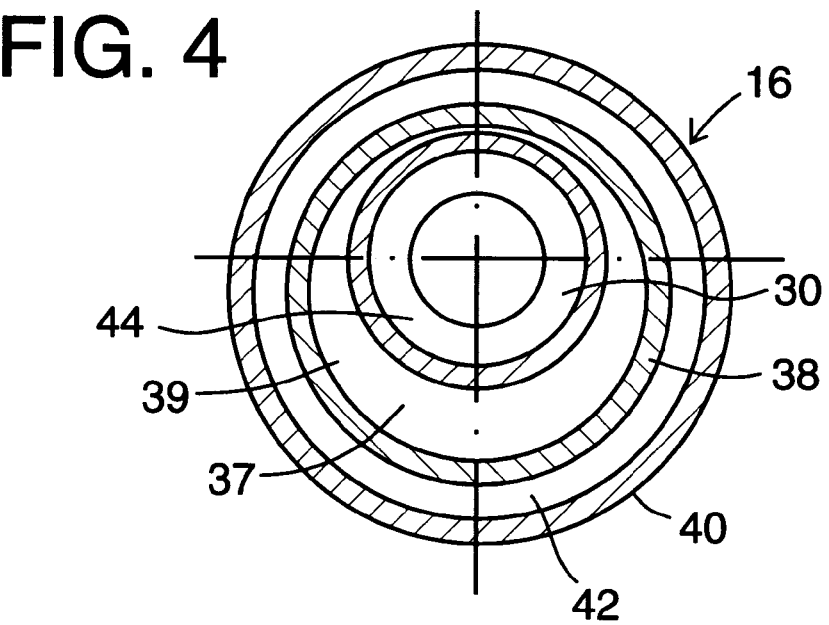

As shown in FIGS. 2 and 3, the injector section 14 includes an annular body 24 interconnected between flange plates 26 and 28 by a plurality of fasteners pins 30. The inlet tube 12 extends into the annular body 24 at right angles to the torch 18, as more clearly seen in FIG. 3, so that it terminates at an open end 32 within an eccentric annular flow chamber 34 of variable decreasing radial width formed about the plasma torch 18. Such chamber 34 is in fluid communication through an annular opening 33 formed about the torch 18 with a reaction flow passage 36 at one axial end thereof enclosed within the eductor section 16 by an inner wall 37 about which an annular insulating cavity 39 is enclosed by a liner sleeve 38 as shown in FIGS. 2 and 4. The insulation filling cavity 39 may be metal shot, metal wool or metal foam. An outer enclosure 40 of the eductor section forms a water or air cooling passage 42 about the liner sleeve 38. The foregoing geometry of the eductor section 16 as shown in FIG. 2 is such as to form a convergent flow nozzle which necks down to a minimum venturi diameter at its outlet end 44 fixedly connected to the inlet end 46 of the diffuser section 20 through which the output plume 48 of the plasma torch 18 extends from the reaction flow passage 36 as shown by dotted line in FIG. 2.

The exit diffuser section 20 is formed by radially spaced conical walls 50, 52 and 60 connected at opposite axial ends thereof to the inlet end 46 of the diffuser and an annular exit end plate 54. Such diffuser walls 50, 52 and 60 form a divergent flow passage 56 from which a gasified waste flow stream exits the disposal apparatus 10. An insulation barrier or layer 58 may be retained on the inner wall 52 enclosing flow passage 56 by means of an outer liner 60.

In accordance with the present invention, appropriately sized particles of organic waste which may be preprocessed are pneumatically transported through the inlet tube 12 into the flow chamber 34 within the injector body 24 and to provide a swirl motion to the organic waste so as deliver an evenly distributed mixture of waste and carrier fluid such as air to the convergent nozzle shaped reaction flow passage 36 of the eductor section 16 within which considerable mixing of the waste and air is continued. The gas plume output 48 of the plasma torch 18 acts as a primary high velocity, high temperature gas stream within the reaction flow passage 36 so as to help induce flow of the waste and air mixture as well as to initiate rapid thermal destruction and partial oxidation of the waste continued within the insulated divergent flow passage 56 of the diffuser section 20 for discharge of either pyrolitic fuel gas to a secondary combustion chamber or directly discharge combustion products to atmosphere.

Various modifications of the foregoing described apparatus 10 may be utilized to conditionally improve the waste disposal technique embodied therein. For example, the inner wall 37 within the eductor section 16 may be perforated or made of porous material so as to introduce therethrough an additional oxidizer into the reaction flow stream within passage 36 to improve efficiency as well as aid cooling by coolant flow through liner passage 42. The air mixed with the waste fed to the inlet tube 12 by some infeed system may be replaced by other carrier fluids such as oxygen enriched air, nitrogen, and steam. Also, the infeed system utilized could introduce atomized liquid to the waste and gas mixture fed to the inlet tube 12.

Other advantages and operational capabilities are derived from the arrangement and geometry of the apparatus 10. By its control over waste stream flow therethrough, the disposal apparatus allows optimization of the thermal destruction process as well as to simplify thermal destruction chemistry. The thermal destruction rate may be maximized with overall size reduction of the apparatus because of the direct interaction between improved mixing of the waste carrier fluid in the waste stream with high temperature conditions provided by the torch plasma plume. The disposal apparatus may also accommodate association with an infeed system that is continuous in waste delivery and which may provide organic particles appropriately sized by preprocessing to insure total gasification during flow passage through the apparatus 10.

Obviously, other modifications and variations of the present invention may be possible in light of the foregoing teachings. It is therefore to be understood that within the scope of the appended claims the invention may be practiced otherwise than as specifically described.

What is claimed is:

1. In combination with a plasma torch, apparatus for processing material by exposure to an output plume of said plasma torch causing thermal conversion of said material, comprising: injector means for receiving an inflow of said material within a carrier fluid to form a mixture; eductor nozzle means operatively connected to the injector means for conducting said mixture therefrom through a reaction flow passage into which the plasma torch projects from the injector means to initiate said thermal conversion by gasification of the mixture in response to exposure to the output plume of the plasma torch; and diffuser means operatively connected to the eductor nozzle means and into which the output plume of the plasma torch extends from the reaction flow passage for continuation of the thermal conversion of the mixture initiated by said thermal gasification before disposal of the material.

2. The apparatus as defined in claim 1 wherein said injector means encloses an annular flow passage of varying radial width through to which said inflow of the material within said carrier fluid is delivered for mixing and from which the mixture is conducted into the reaction flow passage of the eductor nozzle means.

3. The apparatus as defined in claim 2 wherein said diffuser means encloses a divergent flow passage within which said mixture undergoing said thermal gasification is received to continue said thermal conversion before said disposal by discharge to atmosphere.

4. The apparatus as defined in claim 1 wherein said diffuser means encloses a divergent flow passage within which said mixture is received to undergo said continuation of the thermal conversion.

5. The apparatus as defined in claim 1 wherein said conversion is gasification of waste as the material being processed.

6. A method of processing material before disposal by exposure to an output plume of a plasma torch, including the steps of: mixing said material with a carrier fluid under pressure to form a mixture; inducing inflow of the mixture under said pressure of the carrier fluid into a chamber through which said output plume extends from the plasma torch for said exposure of the material thereto to produce a thermal reaction; and discharging gasification products of said thermal reaction from the chamber under continued exposure to the plume extending therefrom to complete said processing before disposal of the material.

7. The method as defined in claim 6 wherein said step of inducing inflow includes: imparting a swirling motion to the mixture during said inflow prior to said exposure thereof to the plume during passage through the chamber.

\* \* \* \* \*